United States Patent [19]

Utner et al.

[11] 4,329,878
[45] May 18, 1982

[54] BRIDGE CIRCUIT FORMED OF TWO OR MORE RESISTANCE STRAIN GAUGES

[75] Inventors: Ferdinand Utner; Harald Vetter, both of Regensburg, Fed. Rep. of Germany

[73] Assignee: Siemens Aktiengesellschaft, Berlin & Munich, Fed. Rep. of Germany

[21] Appl. No.: 141,624

[22] Filed: Apr. 18, 1980

[30] Foreign Application Priority Data

Apr. 23, 1979 [DE] Fed. Rep. of Germany ....... 2916390

[51] Int. Cl.³ .......................... G01B 7/20; G01L 1/22
[52] U.S. Cl. ..................... 73/766; 73/776, 73/862.63; 73/862.67
[58] Field of Search ................. 73/765, 766, 775, 776, 73/862.63, 862.67; 338/2

[56] References Cited

U.S. PATENT DOCUMENTS

| | | |
|---|---|---|
| 2,556,132 | 6/1951 | Ball . |
| 3,134,953 | 5/1964 | Eisler ........................................ 338/2 |
| 3,230,763 | 1/1966 | Frantzis ............................. 73/766 X |
| 3,303,693 | 2/1967 | Stedman ................................ 73/766 |
| 3,611,241 | 10/1971 | Herceg ..................................... 338/2 |
| 3,737,827 | 6/1973 | Paetow . |
| 4,267,724 | 5/1981 | Spoor ............................... 73/862.65 |

FOREIGN PATENT DOCUMENTS 2724817 12/1978 Fed. Rep. of Germany .......... 338/2

Primary Examiner—Charles A. Ruehl
Attorney, Agent, or Firm—Hill, Van Santen, Steadman, Chiara & Simpson

[57] ABSTRACT

A bridge circuit consisting of two or more resistance strain gauges is formed on a synthetic layer on which a resistance layer and a metal layer provided for the terminal elements are applied. The corresponding patterns are etched into the metal and into the resistance layer. Balance surfaces consisting of materials with a temperature coefficient different from that of the resistance layer are connected in series to the resistance strain gauges. By changing the resistance of the balance surfaces, the circuit is balanced in terms of symmetry, in terms of the temperature coefficient of the resistance layer, and in terms of the temperature coefficient of the modulus of elasticity of the test object.

2 Claims, 3 Drawing Figures

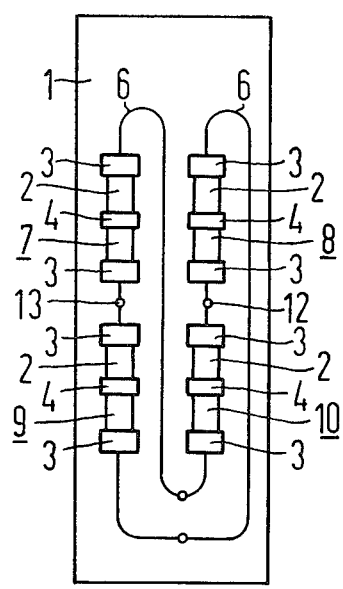
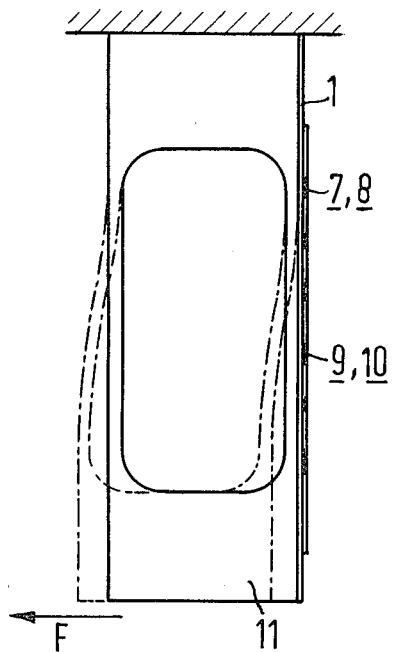
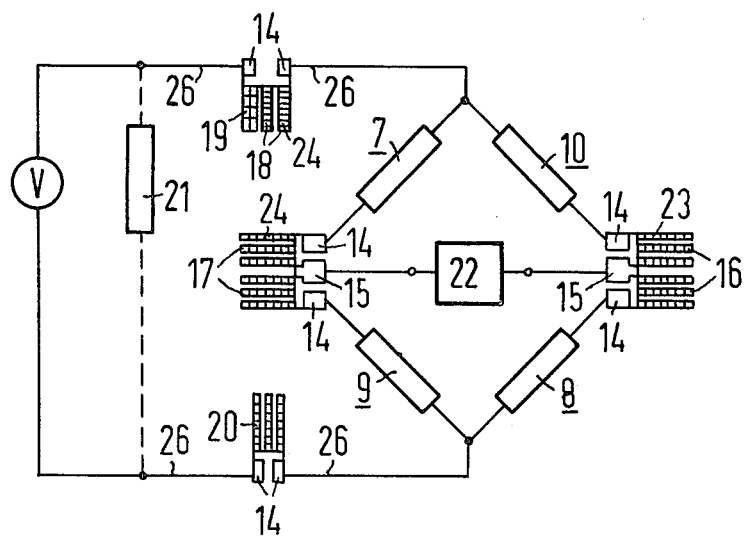

BRIDGE CIRCUIT FORMED OF TWO OR MORE RESISTANCE STRAIN GAUGES

BACKGROUND OF THE INVENTION

1. Field of the Invention

The present invention relates to a bridge circuit for resistance measurement which contains at least one resistance strain gauge which is formed of a metallized synthetic foil.

2. Description of the Prior Art

Such a bridge circuit is known, for example, from U.S. Pat. No. 2,556,132. According to this Letters Patent, strips are cut off from a metallized synthetic foil and glued to a metal tape. The metal tape is secured to the object to be measured. The metallization is connected as a resistance in a bridge circuit.

A bridge circuit consisting of a plurality of resistance strain gauges is known, for example, from the German published application No. 2,049,820. The resistance strain gauges are formed of a metal foil and compensation strips for the compensation of the temporal change of the output voltage of the measuring device are formed onto the resistance strain gauges.

SUMMARY OF THE INVENTION

The object of the present invention is to provide a bridge circuit of two or more resistance strain gauges, the bridge circuit being constructed simply and having a high zero point stability under all operating conditions.

The above object is achieved in that all resistance strain gauges of the bridge circuit are formed of only one resistance layer on a synthetic layer, that contact surfaces consisting of a solderable metal are materially bonded to the resistance layer over the entire surface without an intermediate layer, and that balance surfaces are connected of one piece to the resistance layers and at least partially to the contact surfaces.

The proposed structure guarantees a uniform quality of all resistance strain gauges and the appertaining balance surfaces insofar as they are formed only of the resistance layer. Insofar as the balance surfaces are connected of one piece to the contact surfaces, they exhibit a temperature coefficient differing from the resistance layer. By doing so, the temperature coefficient of the circuit can, for example, be matched to an amplifier.

Advantageously, balance surfaces are connected in series to each of the bridge resistors in the area of the bridge tap. Of these balance surfaces, those lying in one bridge branch are preferably connected of one piece only to the resistance layers, whereas those lying in the other bridge branch are also connected of one piece to the contact surfaces. By doing so, the latter exhibit a different temperature coefficient than the former. Thereby, chromium/nickel preferably serves as the material for the resistance layer and copper as the material for the contact surfaces. Thereby, the bridge symmetry is produced by way of the balance surfaces connected of one piece only to the resistance layers, whereas the temperature coefficient of the bridge circuit is balanced or, respectively, adapted to an amplifier which has the measuring signal applied thereto, by means of the balance surfaces, also connected of one piece to the contact surfaces.

For matching the output signal to the temperature coefficient of the modulus of elasticity of a test object, the feed lines for the bridge circuit are advantageously connected of one piece to the resistance layers and materially bonded over their entire surface to solderable terminal lugs. At least two or more contact surfaces are formed onto the supply lines, the contact surfaces being electrically connected to one another only via balance surfaces. These balance surfaces advantageously exhibit the form of one or more ladders and, for the balance, rungs of these ladders are cut through and/or ladder openings are soldered shut.

An operational amplifier is advantageously connected to the bridge branch, the operational amplifier being connected to the bridge circuit in hydrid technology. By doing so, it becomes possible to employ a normal voltage measuring device as a display instrument for the measured voltages. For adapting the internal resistance of the circuit, a resistor is advantageously connected in parallel to the external terminals of the feed voltage, the resistor being connected of one piece to the remaining resistors of the circuit. This resistor has the same temperature properties as the resistance strain gauges so that it cannot cause errors in the measured values, for example, even temperature changes.

The bridge circuit is advantageously designed in such a manner that it represents a full measuring bridge, that the resistance layers consist of chromium/nickel or nickel/copper and that the contact surfaces consist of copper, that a balance surface of chromium/nickel or nickel/copper is connected in series with one bridge branch and a balance surface which essentially consists of copper is connected in series with the other bridge branch. A tap conductor in each bridge branch is electrically connected to a contact surface arranged between two balance surfaces. Ladder-like balance surfaces of chromium/nickel are connected in series with at least one supply line and the measuring bridge is balanced with respect to symmetry of the bridge resistors, the temperature coefficient of the circuit resistors and the temperature coefficient of the modulus of the elasticity of the test object, and the measuring range is set by means of the same resistors.

What is meant by a full bridge is a Wheatstone bridge whereby the resistance strain gauges serving as bridge resistors are arranged on the test object insofar as possible and connected in such a manner that the two respective resistors are subjected to a compression and two resistors to an expansion, and that the changes of the resistances add up at the taps for the measured values. By doing so, an output signal which is four times as high upon employment of a single resistance strain gauge is achieved.

An advantageous method for manufacturing a proposed bridge circuit is that, in a tape method, a resistance layer is vapor deposited or sputtered onto a metal layer provided for the manufacture of the contact surfaces. The resistance layer is stabilized. A synthetic layer is laminated onto the resistance layer and the resistance layer and the metal foil are then patterned by means of a selected etching. In laminating in the tape method, a very thin adhesive layer can be applied which does not noticeably increase the force required for the expansion of the strain gauge. Selective etching is taken to mean a method in which, first, a pattern is etched into the copper layer and the resistance layer lying beneath the copper layer and further parts of the copper layer lying on top are then etched away without damage to the resistance layer therebeneath.

No influence of any kind of an adhesive on the values of the bridge circuit is produced when, in the tape method, a resistance layer is vapor deposited and/or dusted onto a synthetic layer consisting of a synthetic which is temperature stable up to more than 200° C., in that a metal layer provided for the contact surfaces is applied thereon, in that patterns are generated in the resistance layer and in the metal layer by means of selective etching, and in that, finally, the resistance layer is stabilized. The stabilization, for example, given chromium/nickel as the resistance layer, occurs at temperatures above 200° C. It is therefore recommended to employ a polyimide material as the synthetic layer.

A rational manufacture is rendered possible in that ladder-like balance surfaces are connected in series to the resistors, in that a rough balance of the circuit occurs by means of material removal at the corresponding paths of the resistance layers, and in that a fine balance occurs by means of separating ladder rungs and/or by means of soldering ladder openings closed. The balance can advantageously be controlled by means of a computer which calculates the rungs to be cut from the zero point deviations and the geometry of the rungs.

Upon employment of a polyimide material as the synthetic layer, it is possible that a laser balance of the resistance layer vapor deposited onto the synthetic layer can be carried out without a disruptive damage to the synthetic layer, since a polyimide foil does not rupture or become brittle given a load from a laser beam. Therefore, for example, a balance precision of ±0.1% can be achieved. Due to the low layer thickness obtainable, a significant reduction of the dimension is possible, so that a full bridge circuit can be incorporated on the surface of a single resistance strain gauge of types heretofore known.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 1 is a plan view of a full measuring bridge constructed in accordance with the present invention;

FIG. 2 illustrates a strain spring onto which a full measuring bridge of the type illustrated in FIG. 1 is bonded; and FIG. 3 is a schematic circuit diagram of a full measuring bridge having balance surfaces constructed in accordance with the present invention.

DESCRIPTION OF THE PREFERRED EMBODIMENTS

Referring to FIG. 1, resistance layers 2 and terminal surfaces 3 are applied to a synthetic layer 1 and materially bonded thereto. Conductive paths 6 connect the resistance strain gauges 7–10 formed in this manner. According to FIG. 2, the entire bridge circuit is bonded onto a strain measuring spring 11. The strain measuring spring 11 is designed as a parallel measuring spring which is to measure forces in the direction of the arrow F. On the strain measuring spring 11, the resistance strain gauges 7 and 8 are subjected to a tensile stress, while the resistance strain gauges 9 and 10 are subjected to a compression. By means of the conductive paths 6, the resistance strain gauges 7–10 are interconnected in such a manner that the changes of resistance of all four resistance strain gauges 7–10 add up at taps 12 and 13.

According to FIG. 3, balance surfaces 16–20 are connected in series to the resistance strain gauges 7–10. The balance surfaces 16 and 17 lie in a respective branch of the bridge circuit. One respective balance surface 16 or, respectively, 17, extends from one respective contact surface 14 to a contact surface 15 to which an operational amplifier 22 is electrically connected. The balance surfaces 18–20 are connected in series to the supply lines 26 by way of the contact surfaces 14. A resistor 21 serves for adapting the internal resistance of the circuit.

The balance surfaces 16 are formed onto the resistance layer of the resistance strain gauges 7–10. They can be employed for balancing the resistance values of the circuit upon formation of a higher resistance between the contact surfaces 14 and 15 by means of cutting through ladder rungs 23. The balance surfaces 17 essentially consist of copper. The copper is materially bonded in a thick layer to the resistance layer lying thereunder. Therefore, the resistance layer does not add noticeably to the conductance of the balance surfaces. The balance surfaces 17 render possible the increase of the temperature coefficient of the bridge branch with the resistance strain gauges 7 and 9. By doing so, the temperature coefficient of the output signal produced by the operational amplifier 22 can be influenced. The balance surfaces 18 and 20 likewise essentially consist of copper. They render possible the balance of the temperature coefficient of the modulus of elasticity of the test object, for example, of the measuring spring 11. The balance surfaces 19, in turn, consist of resistance material and render possible the adjustment of the measuring range without noticeable influence on the temperature behavior of the circuit.

The balance surfaces essentially consisting of copper can be designed not only high-resistant but, rather, also low-resistant in that individual ladder apertures 24 are soldered shut.

The proposed bridge circuits can be manufactured in particularly small dimensions. They have a good long-term stability and a good zero point stability, particularly when designed as full bridge circuits, they have identical aging behavior, a strictly linear relationship between output signal and change in length, and a constant, negative temperature coefficient of the gauge factor which, by definition, indicates the voltage change per change in length of the test object, and they have a good resistance to alternating load. Nickel/chromium layers 200 Å thick are suitable as the resistance layers, copper layers 700 Å–2000 Å thick are vapor deposited as the metal layers for the conductive paths and are subsequently galvanically strengthened to approximately 3–5 μm.

As a result of the balance possibilities described, complicated electronic auxiliary circuits for the compensation of disturbances can be eliminated, which promotes the precision and the linearity behavior of the display, since the electronic auxiliary circuits are burdened with errors, on principle. In addition, it is also possible to integrate one or more full bridges with the necessary terminal lines and balance surfaces on relatively large layer surfaces. By doing so, a desired geometrical bridge symmetry can be transferred to the test specimen in one work cycle. For example, a measurement of expansion in two directions which are perpendicular to one another can be guaranteed by means of the attachment of only a single layer. By doing so, a precise mutual position of resistance strain gauges or, respectively, full bridges is guaranteed from the very outset.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A bridge circuit for resistance measurement in which the bridge circuit represents a full measuring bridge, comprising:
    a plurality of resistance strain gauges connected in a bridge arrangement and including a pair of bridge taps;
    said resistance strain gauges comprising a metallized resistance layer for all of said resistance strain gauges forming bridge resistors and a common synthetic layer carrying said resistance layers;
    each of said resistance strain gauges comprising contact surfaces of solderable material directly bonded to said resistance layer;
    a plurality of balance surfaces connected to said resistance layer;
    first ones of said balance surfaces being connected in series with each of the relevant bridge resistors adjacent said taps;
    current supply lines connected to said bridge circuit at respective portions of said resistance layer; at least two contact surfaces on at least one of said supply lines connected to one another via said balance surfaces;
    each of said balance surfaces comprising a ladder structure including rungs and openings, and wherein said rungs can be cut and said openings can be soldered for the purpose of balancing;
    an operational amplifier connected to said taps;
    one resistor of one portion of the resistance strain gauges being connected in parallel to the external current supply lines;
    said resistance layer comprising chromium/nickel;
    said contact surfaces comprising copper;
    said balance surfaces including first balance surfaces connected in series with one bridge branch and comprising chromium/nickel, and including second balance surfaces connected in series with another bridge branch and comprising additional copper;
    a tap in each bridge branch connected to a contact surface between two balance surfaces;
    each of said balance surfaces electrically connected to at least one bridge resistor;
    said bridge circuit adapted, as to symmetry, to the bridge resistors and to the temperature coefficients of the circuit resistors and a test object; and
    the measuring range being set by said balance resistors.

2. A bridge circuit for resistance measurement in which the bridge circuit represents a full measuring bridge, comprising:
    a plurality of resistance strain gauges connected in a bridge arrangement and including a pair of bridge taps;
    said resistance strain gauges comprising a metallized resistance layer for all of said resistance strain gauges forming bridge resistors and a common synthetic layer carrying said resistance layers;
    each of said resistance strain gauges comprising contact surfaces of solderable material directly bonded to said resistance layer;
    a plurality of balance surfaces connected to said resistance layer;
    first ones of said balance surfaces being connected in series with each of the relevant bridge resistors adjacent said taps;
    current supply lines connected to said bridge circuit at respective portions of said resistance layer;
    at least two contact surfaces on at least one of said supply lines connected to one another via said balance surfaces;
    each of said balance surfaces comprising a ladder structure including rungs and openings, and wherein said rungs can be cut and said openings can be soldered for the purpose of balancing;
    an operational amplifier connected to said taps;
    one resistor of one portion of the resistance strain gauges being connected in parallel to the external current supply lines;
    said resistance layer comprising nickel/copper;
    said contact surfaces comprising copper;
    said balance surfaces including first balance surfaces connected in series with one bridge branch and comprising nickel copper, and including second balance surfaces connected in series with another bridge branch and comprising additional copper;
    a tap in each bridge branch connected to a contact surface between two balance surfaces;
    each of said balance surfaces electrically connected to at least one bridge resistor;
    said bridge circuit adapted, as to symmetry, to the bridge resistors, and to the temperature coefficients of the circuit resistors and a test object; and
    the measuring range being set by said balance resistors.

* * * * *